(12) United States Patent
Colignon

(10) Patent No.: US 7,155,900 B2
(45) Date of Patent: Jan. 2, 2007

(54) SUPPORT SYSTEM FOR THE MAINTENANCE OF A PARTICLE FILTER FITTED IN AN EXHAUST SYSTEM ON A MOTOR VEHICLE ENGINE

(75) Inventor: Christophe Colignon, Levallois Perret (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/564,671

(22) PCT Filed: Oct. 5, 2004

(86) PCT No.: PCT/FR2004/002513

§ 371 (c)(1),
(2), (4) Date: Jan. 13, 2006

(87) PCT Pub. No.: WO2005/049986

PCT Pub. Date: Jun. 2, 2005

(65) Prior Publication Data

US 2006/0191256 A1    Aug. 31, 2006

(30) Foreign Application Priority Data

Nov. 7, 2003 (FR) .................................. 03 13160

(51) Int. Cl.
*F01N 3/00* (2006.01)
(52) U.S. Cl. .................. 60/297; 60/295; 60/311; 55/DIG. 30
(58) Field of Classification Search .................. 60/276, 60/285, 295, 297, 311; 55/DIG. 30
See application file for complete search history.

(56) References Cited

U.S. PATENT DOCUMENTS

| 6,405,528 B1 * | 6/2002 | Christen et al. ............... 60/295 |
| 6,622,480 B1 * | 9/2003 | Tashiro et al. ................ 60/295 |
| 6,854,265 B1 * | 2/2005 | Saito et al. ................... 60/295 |
| 6,928,809 B1 * | 8/2005 | Inoue et al. .................. 60/297 |
| 7,069,721 B1 * | 7/2006 | Gotou ......................... 60/297 |
| 2003/0131592 A1 | 7/2003 | Masumi et al. |

FOREIGN PATENT DOCUMENTS

| EP | 1103702 A | 5/2001 |
| EP | 1229223 A | 8/2002 |
| EP | 1234959 A | 8/2002 |

* cited by examiner

*Primary Examiner*—Binh Q. Tran
(74) *Attorney, Agent, or Firm*—Nicolas E. Seckel

(57) ABSTRACT

This system for assisting the maintenance of a particle filter integrated into an exhaust line of a motor vehicle diesel engine is characterized in that it comprises means (1) for calculating the volume of ash from the engine lubricating oil, means (2) for calculating the volume of ash from the engine fuel, means (4) for calculating the usable volume (V.u) of the particle filter from a total volume of said filter when new (V.new) and the previously calculated volumes of ash, and means (5) for calculating a degree of clogging of the particle filter (d.c.) from the total volume of the filter when new (V.new) and the previously calculated usable volume (V.u) to trigger a maintenance request (Maint.Req.) if the degree of clogging (d.c.) exceeds a predetermined threshold (threshold).

4 Claims, 1 Drawing Sheet

SUPPORT SYSTEM FOR THE MAINTENANCE OF A PARTICLE FILTER FITTED IN AN EXHAUST SYSTEM ON A MOTOR VEHICLE ENGINE

BACKGROUND ART

The present invention concerns a system for assisting maintenance of a particle filter integrated in an exhaust line of a motor vehicle diesel engine.

Because a particle filter clogs up progressively whenever a vehicle equipped with the filter is in use, one of the main problems linked to the use of a particle filter is maintaining it. The residues that accumulate in it come mainly from four different sources. These residues may consist of metal particles from the engine or the exhaust line or that are not filtered out on the inlet side of the engine. Other residues may take the form of ash from the lubricants used in the engine or the fuel supplied to it. Finally, further residues may take the form of combustion residues of an additive for assisting regeneration. Additives of this kind are known in the art and may be mixed with the fuel supplied to the engine to lower the combustion temperature of soot trapped in the particle filter.

The above four kinds of residue accumulate in a particle filter of a design that uses an additive to assist regeneration by encouraging the combustion of soot. If this kind of additive is not used, for example in the case of impregnated or catalytic particle filters, only three of the above kinds of residue are present in the filter, which reduces the cumulative volume of residues for a given distance traveled.

However, regardless of the design used, the particle filter clogs up progressively, thereby reducing the volume available for storing particles. Because of this, to preserve the thermo-mechanical efficacy of the filter, it must be regenerated more and more frequently, and this is reflected in an increase in the additional fuel consumption associated with the particle filter in the situation where regeneration is effected by post-injection or by using a burner, for example, and by dilution of the engine lubricating oil by the post-injected fuel, with a risk of damaging the engine.

What is more, the reduced space available for storing soot leads to increasingly high head losses through the filter, which is reflected both in an increase in the fuel consumption of the vehicle outside the regeneration phase and in a risk of damaging the engine, for example if the pressure difference across the filter is too high and causes re-opening of the valves. It is therefore necessary to clean or to change the filter after traveling a certain distance, when the volume available for storing particles has become too small.

In current applications in which vehicles are equipped with a particle filter, cleaning is effected at a fixed distance, for example 120 000 kilometers, regardless of how the vehicle is used. Unfortunately, the quantity of residues stored depends on many factors, such as oil consumption, additive consumption, the number of regenerations already attempted, etc.

Two vehicles that have traveled the same distance may have accumulated very different quantities of residues, according to how the vehicles are used. For example, travel in towns with an average fuel consumption of 10 liters per 100 kilometers generates 67% more additive consumption residues than travel on the open road with an average consumption of 6 liters per 100 kilometers. Clearly, by defining a particle filter cleaning period for all vehicles in advance, the degree of clogging of their particle filters is not necessarily optimized, which is reflected in the considerable disparities observed between the degree of clogging of particle filters at the time of cleaning operations.

Moreover, the current climate, with a high demand to impose the use of a particle filter, has particularly highlighted the overall cost of the system and in particular the cost of maintenance, which makes it essential to delay the particle filter cleaning operation as long as possible, to reduce the cost to the user.

It is therefore necessary to optimize the frequency of cleaning the particle filter.

SUMMARY OF THE INVENTION

The object of the invention is to solve the above problems.

To this end, the invention provides a system for assisting the maintenance of a particle filter integrated in an exhaust line of a motor vehicle diesel engine, the system being characterized in that it comprises:

means for calculating the volume of ash from the engine lubricating oil, means for calculating the volume of ash from the engine fuel, means for calculating the usable volume of the particle filter from a total volume of said filter when new and the previously calculated volumes of ash, and means for calculating a degree of clogging of the particle filter from the total volume of the filter when new and the previously calculated usable volume to trigger a maintenance request if the degree of clogging exceeds a predetermined threshold.

According to other features of the above system for assisting maintenance:

it further comprises means for calculating the volume of residues from combustion of an additive for reducing the combustion temperature of particles trapped in the particle filter and mixed with the fuel supplied to the engine, said means being connected to means for calculating the usable volume;

it further comprises means for calculating the distance at which a particle filter maintenance operation should be timetabled from the distance traveled by the vehicle since the particle filter was new or cleaned and the previously calculated degree of clogging of the filter;

it further comprises means for calculating the distance remaining to be traveled before particle filter maintenance from the previously calculated maintenance distance and the distance already traveled by the vehicle.

BRIEF DESCRIPTION OF THE DRAWING

The invention will be better understood on reading the following description, which is given by way of example only and with reference to the appended drawing, which shows the general structure of an assistance system of the invention.

DETAILED DESCRIPTION OF PARTICULAR EMBODIMENTS

Figure 1:
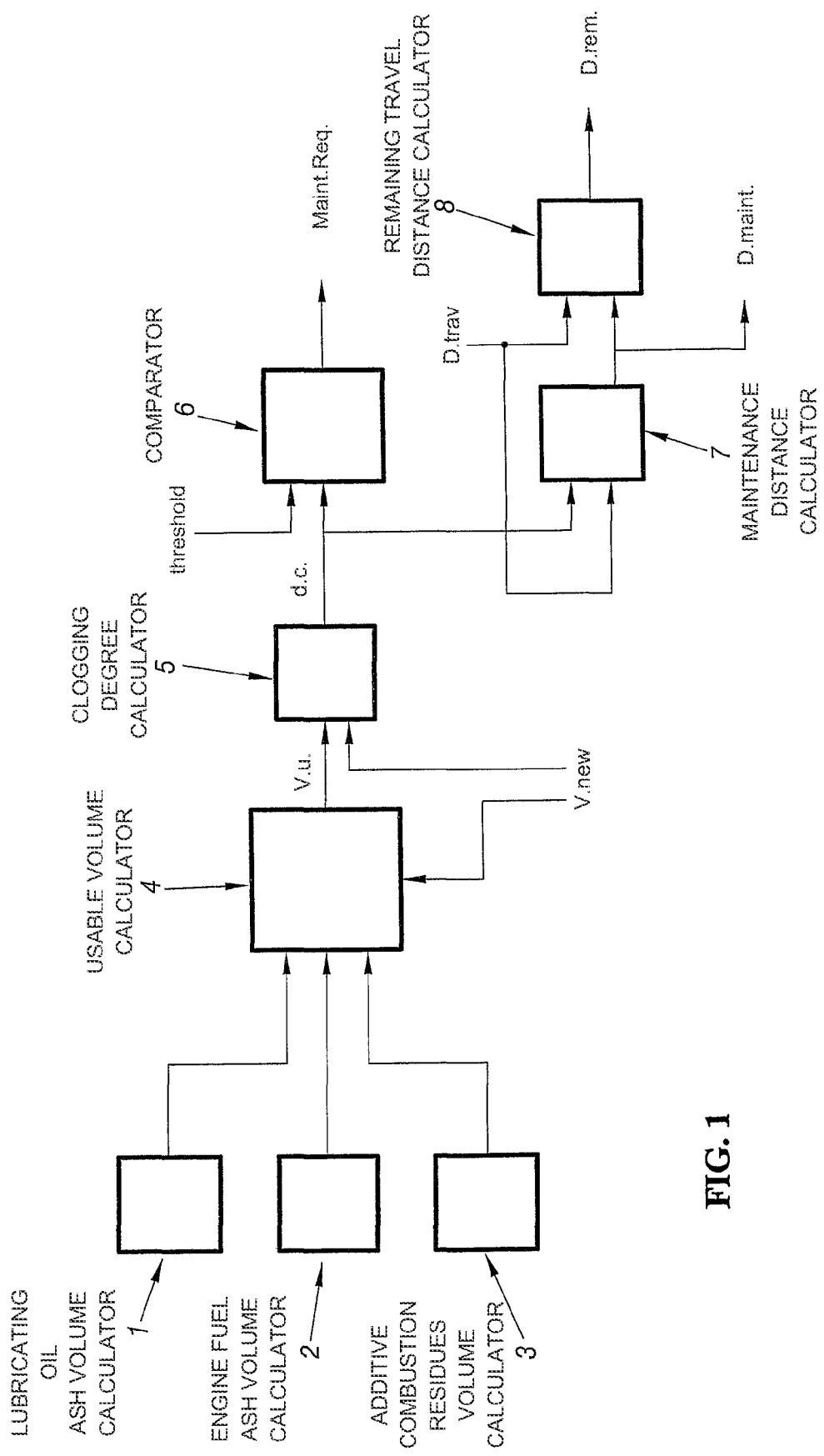

The object of the system of the invention is to estimate as accurately as possible at all times the volume of residues accumulated in a particle filter and to compare it to a threshold in order to determine whether it is necessary to clean the filter or not.

The filter is integrated in an exhaust line of a motor vehicle diesel engine.

The system should also predict at what distance the cleaning operation should be effected, and this information, accessible to the after-sales network of the manufacturer, should enable the manufacturer and the user of the vehicle to timetable filter maintenance.

The objective of the above system is therefore to estimate the degree of clogging of the particle filter by the residues at all times and to predict when it will be necessary to clean the filter. To this end, the quantity of ash from the lubricant and the fuel is estimated, regardless of the design of the particle filter, e.g. a catalytic particle filter, an impregnated particle filter, a non-coated particle filter used without an additive or a particle filter used with an additive, and also the quantity of combustion residues of the additive, which is nil for a catalytic particle filter, an impregnated particle filter or an uncoated particle filter used without an additive. It has been confirmed by analyzing samples of residues that the quantities of metal residues from the engine and the exhaust line and of metal particles that are not filtered out on the inlet side of the engine may be considered to be negligible.

The mass of ash from the lubricant accumulated in the filter depends on the lubrication oil consumption of the engine and on the ash content of the lubricant. To simplify this calculation, it is assumed that the operator of the vehicle uses the oil recommended by the manufacturer throughout the life of the vehicle, i.e. that the ash content is constant. The mass of ash from the oil can then be estimated in various ways. Thus a predetermined oil consumption value can be used that depends on the engine/vehicle application in question.

An integrator type model may also be used that takes account of instantaneous oil consumption as a function of the operating conditions of the engine and in particular as a function of the engine speed (rpm) and torque.

Other more complex models taking into account the composition of the oil, for example its contents of phosphorus, calcium, potassium, etc., the quality of the oil or an oil maintenance indicator, may also be envisaged for estimating the quantity of ash accumulated in the particle filter.

When using the typical composition of an oil, the mass of ash is calculated as a function of the nature of the compounds resulting from combustion of the oil, for example phosphorus found in the filter in the form of $PO_4$, zinc in the form of $ZnO$, calcium in the form of $CaSO_4$, etc.

The mass of ash accumulated in the filter coming from the fuel depends directly on the fuel consumption of the vehicle and on the ash content of the fuel. To simplify the calculation it is assumed that the ash content of fuel is constant, regardless of the source of the fuel. The simplest calculation of the quantity of ash in the fuel consists in using an integrator which multiplies the instantaneous fuel consumption by the ash content of the fuel and by the instantaneous consumption calculation time increment.

If an additive is used, the mass of residues accumulated in the filter coming from the additive depends on the quantity of additive that is injected into the fuel tank. There are several ways to estimate this. For example, it is possible to use information on the quantity of additive injected supplied by an additive metering system management computer, but it is equally feasible to take into account the cumulative consumption of fuel since the start of the life of the vehicle multiplied by the nominal additive dosage.

Once the total mass of residues has been calculated, it is necessary to divide it by the density of the residues to obtain the actual filter volume occupied by the residues. To determine the external volume that this represents, as only one passage in two of the filter is filled with residues, it is necessary to divide this volume by the aperture ratio of the filter, i.e. the ratio between the open front surface area (only the open passages) and the total front surface area of the filter. This gives an aperture ratio that depends on the structure of the filter, i.e. on the density of the cells, the thickness of the walls, the thickness of the cement between the filter units if the filter is segmented, etc.

The density of the residues may be taken into account in various ways. In the simplest case, it is a constant value, but it may be expressed in a more complex way to make it as close as possible to reality. The density of the residues is observed to vary as the filter becomes progressively clogged. In general, an increase in the density of the residues is observed. In this case, the density may be determined from a curve that is a function of the distance traveled since the beginning of the service life of the vehicle or since the last cleaning of the filter, the quantity of additive already used, the cumulative fuel consumption or the total mass of residues already accumulated.

Once the volume of residues has been calculated, the volume remaining free to store particles is determined and is compared to a threshold value that indicates the minimum volume acceptable before the filter must be cleaned. That minimum volume is a predetermined volume based on considerations of the maximum regeneration frequency given the additional fuel consumption caused by the filter regeneration phases, dilution of the oil by the post-injected fuel or excessive head loss degrading the performance of the engine. If the free volume falls below the threshold, a filter cleaning request is initiated.

During the standard maintenance operations on the vehicle, for example every 20 000 or 30 000 kilometers, the after-sales network of the manufacturer must also be able to access certain data for obtaining information on the degree of clogging of the filter relative to the recommended maximum volume before the filter must be cleaned and on the estimated distance at which the particle filter should be cleaned, i.e. the distance at which the minimum free volume will be reached. The same information may instead take the form of a remaining distance to be traveled by the vehicle before the filter must be cleaned.

The estimate of the distance at which the filter must be cleaned is merely indicative and is based on the assumption that the profile of use of the vehicle will be the same in the future as it is at present.

To refine the estimate of when filter maintenance will be required, criteria may be added based on the measured head loss of the filter immediately after regeneration, i.e. when there are no longer any particles in the filter passages. For example, a head loss threshold determined from a curve that is a function of the volume flowrate of gases through the filter could be considered.

This is illustrated in the appended figure, which shows a system for assisting with the maintenance of a particle filter integrated in an exhaust line of a motor vehicle diesel engine, which system includes means 1 for calculating the volume of ash from the lubricating oil of the engine, means 2 for calculating the volume of ash from the fuel supplied to the engine, and, when an additive intended to lower the combustion temperature of particles trapped in the particle filter is mixed with the fuel supplied to the engine, means 3 for calculating the volume of combustion residues of that additive.

The residue and ash volume information is delivered to means 4 for calculating the usable volume V.u of the particle filter from a total volume V.new of the filter when new or cleaned and volumes of ash and where applicable of previously calculated residues.

The calculated usable volume V.u is then delivered to means 5 for calculating a degree of clogging d.c. of the particle filter from the total volume V.new of the filter when new or cleaned, and the degree of clogging information d.c. is compared to a predetermined threshold (threshold) by comparison means 6 to trigger a particle filter maintenance request Maint. Req. if the degree of clogging d.c. exceeds the predetermined threshold.

Of course, additional information may be envisaged; for example, means 7 may be provided for calculating the distance D. maint. at which particle filter maintenance must be timetabled from a distance D. trav. traveled by the vehicle since the particle filter was new or cleaned and the previously calculated degree of clogging d.c. of the filter.

Moreover, means 8 may also be provided for calculating the distance D. rem. remaining to be traveled before particle filter maintenance from the previously calculated maintenance distance D. maint. and the distance D. trav. already traveled by the vehicle.

A detailed example of the above calculation is given below.

The table below defines the symbols used:

| Designation | Description | Unit |
|---|---|---|
| $V_0$ | Total volume of new filter | L |
| Oil cons. | Engine oil consumption per kilometer | L/km |
| $\rho_{res}$ | Additive and lubricant residue density | g/L |
| Open area ratio | Open front surface area ratio for filtering particles and storing residues | — |
| $K_{additive}$ | Mass ratio of additive residues/mass of additive used (dosage) | — |
| $P_{oil}$ | Oil density | g/L |
| $K_{fuel}$ | Ratio of ash coming from fuel/mass of additive used | — |
| Ash content | Content of residues coming from combustion of lubricant | % |
| Distance since new filter | Distance traveled since filter new or cleaned | km |
| Total quantity of additive | Mass of additive injected since filter new or cleaned | |
| Free volume | Minimum free volume for storing particles | L |

Calculation of Volume of Additive Combustion Residues

Volume of residues $(t)$=Total quantity of additive $(t) * K_{additive}/(\text{Open area ratio} * \rho_{res})$ Calculation of Volume of Oil Ash Oil ash volume=Oil cons.$* \rho_{oil} *$Distance since new filter*Ash content/(100*Open area ratio*$\rho_{res}$)

The variable 'Distance since new filter' corresponds to the distance traveled by the vehicle since the filter was new or cleaned.

Calculation of Volume of Fuel Ash

Fuel ash volume $(t)$=Total quantity of additive $(t) * K_{fuel}/(\text{Open area ratio} * \rho_{res})$ Calculation of Usable Volume of Filter Usable volume $(t)=V_0$–Volume of residues $(t)$–Oil volume–Fuel ash volume If the volume reaches a minimum limit value, the user is prompted to clean the filter.

Calculation of Degree of Clogging of the Filter by Residues

The degree of clogging of the filter represents the percentage of the volume occupied by residues relative to the maximum volume permissible before the filter has to be cleaned. If the degree of clogging of the filter is 100%, it is necessary to clean the filter.

Degree of clogging of filter $(t)=(V_0-\text{Usable volume}\ (t))/(V_0-\text{Free volume})*100$ Calculation of the Distance for Timetabling Cleaning of the Filter This variable is used by the after sales network to estimate the distance at which the particle filter should be changed or cleaned.

Filter cleaning distance $(t)$=distance traveled since filter new*100/Degree of clogging of filter $(t)$ Calculation of Remaining Distance Before Cleaning the Filter This variable is used by the after sales network to estimate the remaining distance to be traveled before changing or cleaning the particle filter.

Remaining distance before cleaning filter $(t)$=Filter cleaning distance $(t)$–Distance since new filter Clearly, a system of the above kind makes it possible to optimize and to reduce the cost of particle filter maintenance.

The invention claimed is:

1. A system for assisting the maintenance of a particle filter integrated into an exhaust line of a motor vehicle diesel engine, the system comprising:
    means for calculating a first volume of ash from an engine lubricating oil,
    means for calculating a second volume of ash from an engine fuel,
    means for calculating a usable volume of the particle filter from a total volume of said filter when new and the previously calculated first and second volumes of ash, and
    means for calculating a degree of clogging of the particle filter from the total volume of the filter when new and the previously calculated usable volume to trigger a maintenance request if the degree of clogging exceeds a predetermined threshold.

2. A maintenance assistance system according to claim 1, further comprising means for calculating a volume of residues from combustion of an additive for reducing a combustion temperature of particles trapped in the particle filter and mixed with the fuel supplied to the engine, said means being connected to means for calculating the usable volume.

3. A maintenance assistance system according to claim 1, further comprising means for calculating a distance at which a particle filter maintenance operation should be timetabled from a distance traveled by the vehicle since the particle filter was new or cleaned and the previously calculated degree of clogging of the filter.

4. A maintenance assistance system according to claim 3, further comprising means for calculating a distance remaining to be traveled before particle filter maintenance from the previously calculated maintenance distance and the distance already traveled by the vehicle.

* * * * *